US 6,570,900 B2

(12) United States Patent
Furumoto et al.

(10) Patent No.: US 6,570,900 B2
(45) Date of Patent: *May 27, 2003

(54) METHOD AND APPARATUS FOR REPLENISHING DYE SOLUTION IN A DYE LASER

(75) Inventors: Horace W. Furumoto, Wellesley, MA (US); Harry L. Ceccon, Boston, MA (US); George E. S. Cho, Hopkinton, MA (US); Mark P. Hacker, Burlington, MA (US)

(73) Assignee: Cynosure, Inc., Chelmsford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/877,500

(22) Filed: Jun. 8, 2001

(65) Prior Publication Data

US 2001/0043635 A1 Nov. 22, 2001

Related U.S. Application Data

(63) Continuation of application No. 08/929,883, filed on Sep. 15, 1997, now Pat. No. 6,246,710, which is a continuation-in-part of application No. 08/165,331, filed on Dec. 10, 1993, now Pat. No. 5,668,824, which is a continuation-in-part of application No. 08/098,467, filed on Jul. 28, 1993, now abandoned.

(51) Int. Cl.[7] .................................................. H01S 3/20
(52) U.S. Cl. .............................. 372/54; 372/51; 372/53; 372/34
(58) Field of Search .............................. 372/51, 53, 54, 372/34

(56) References Cited

U.S. PATENT DOCUMENTS

| 4,139,342 A | 2/1979 | Sheldrake et al. | ............ 372/53 |
|---|---|---|---|
| 4,364,015 A | 12/1982 | Drake | ............ 372/53 |
| 4,445,217 A | 4/1984 | Acharekar et al. | ............ 372/53 |
| 4,878,224 A | * 10/1989 | Kuder | ............ 372/53 |
| 4,891,817 A | * 1/1990 | Duarte | ............ 372/54 |
| 4,896,329 A | * 1/1990 | Knaak | ............ 372/53 |
| 4,977,571 A | 12/1990 | Furumoto et al. | ............ 372/54 |
| 5,109,387 A | * 4/1992 | Garden | ............ 372/53 |
| 5,668,824 A | * 9/1997 | Furumoto | ............ 372/54 |
| 6,246,710 B1 | * 6/2001 | Furumoto | ............ 372/54 |

FOREIGN PATENT DOCUMENTS

| JP | 0002199 | 1/1990 | ............ 372/53 |
|---|---|---|---|
| JP | 0285694 | 11/1990 | ............ 372/53 |
| JP | 0019385 | 1/1991 | ............ 372/53 |
| JP | 0183184 | 8/1991 | ............ 372/53 |
| WO | 9101053 | 1/1991 | ............ 372/53 |

OTHER PUBLICATIONS

Instruction Manual TDL—10, Candela Corporation, Oct. 1985.*

G.T. Schappert et al., "Temperature Tuning of an Organic Dye Laser", *Applied Physics Letters*, 13(4): 124–126 (Aug. 15, 1968).

(List continued on next page.)

*Primary Examiner*—Leon Scott, Jr.
(74) *Attorney, Agent, or Firm*—Hamilton, Brook, Smith & Reynolds, P.C.

(57) ABSTRACT

In a dye laser system, a porous bed filter is loaded with dye prior to operation of the system. With repeated firings, the dye solution is filtered by the porous bed filter to remove by-products of the laser process. Solute concentration is monitored and dye and additives removed by the filter are replenished by a metering pump. Precise temperature control assures consistent filtering of dye by the filter for more consistent color and energy output. To control the metering pump, the differential output of a two-channel absorption detector is digitized. The digitized signal is loaded into a counter which drives the metering pump. The useful lifetime of the dye solution is enhanced by incorporating pH buffers in the solution.

42 Claims, 4 Drawing Sheets

OTHER PUBLICATIONS

LFDL–8 Instruction Manual, Cynosure, Inc., Bedford, MA, Revised Nov. 1992.

Schade, W. et al., "Temperature tuned distributed feedback dye laser with high repetition rate", *Applied Optics,* 2:9, No. 27, pp. 3950–3954 (Sep. 20, 1990).

Mostovinikow, V.A. et al., "Recovery of Lasing Properties of Dye Solutions after Their Photolysis," *Sov. J. Quantum Electron,* 6(9), Sep. 1976, pp. 1126–1128.

Winters, B.H. et al., "Photochemical Products in Coumarin Laser Dyes," Laboratory for Physical Sciences, College Park, MD, Aug. 26, 1974.

LFDL–8 Instructional Manual, Candela Laser Corporation, Wayland, MA, Revised Oct. 1987.

LFDL–8 Instructional Manual, Candela Laser Corporation, Wayland, MA, Jan. 1982, Revised Jun. 1987.

Special Instruction and Test Results for the LFDL–2 Wave Guide Laser, Candela Laser Corporation, Wayland, MA Sep. 1982.

Instruction Manual, TFDL–10, Adapted for SLAC, Candela Corporation, Natick, MA, Oct. 1985.

"Final Report on the LFDL–10 Laser System for the GCA Corporation," Candela Corporation, Natick, MA, Section II, subsection 5, pp. 13–15 and 27, Mar. 1982.

Furumoto, H., "Dye Chemistry and System Study for Optimum Laser Operation at 436 NM Using the LFDL–10 Laser," prepared for Burlington Division Geophysical Corporation of America, pp. 1–23, Mar. 1982.

Britt et al., "The Effect of pH or Photobleaching of Organic Laser Dyes," *IEEE J. Quantum Electron.,* (Dec. 1972), 913–914.

Matsunaga et al., "Effect of pH on Dye–Laser Output Power", *J. Appl. Phys.,* 48(2): 842–844 (Feb. 1977).

Korobov et al., "Dependence of the Quantum Yield of Intercombinational Conversion into the Triplet State of Rhodamine 6G on the pH of the Medium", *Zhur. Prikl. Spektrosk.* 24 (1) 28–31, (Jan. 1976).

A.N. Fletcher et al., "Improving the Output and Lifetime of Flashlamp–Pumped Dye Lasers", *Proceedings of the International Conference on Lasers'85,* 797–804, Dec. 2–6, 1985.

* cited by examiner

METHOD AND APPARATUS FOR REPLENISHING DYE SOLUTION IN A DYE LASER

RELATED APPLICATIONS

This application is a continuation of prior U.S. Ser. No. 08/929,883, filed Sep. 15, 1997, now U.S. Pat. No. 6,246,710 which is a continuation-in-part of prior U.S. Ser. No. 08/165,331 filed Dec. 10, 1993, now U.S. Pat. No. 5,668,824, which is a continuation-in-part of prior U.S. Ser. No. 08/098,467, filed Jul. 28, 1993, now abandoned, the contents of which are incorporated herein by reference.

BACKGROUND

Dye lasers excited with flashlamp were first discovered by Sorokin and Lankard in 1967. These flashlamp excited dye lasers have found use in many applications. The dye, which is the laser medium, is dissolved in a solvent, most usually of organic nature. The laser medium, being a solution, makes the flashlamp excited dye laser a liquid laser. The dye solution is circulated through a laser pump cavity by means of a capillary dye cell, the axis of which in most instances coincides with the laser axis. The dye cell is activated or excited by a flashlamp which is in close proximity to it. The ends of the capillary dye cell are terminated with laser windows through which the laser beam can be extracted.

The dye solution, comprised of the laser dye or dyes and organic solvent and which may include other chemical additives, undergoes photochemical changes induced by the flashlamp light. The photochemical action may result in the destruction of dye molecules and generation of by-products that absorb at the lasing wavelength and that reduce the gain of the laser for subsequent excitation pulses. To minimize the contribution of these deleterious reactions, a large reservoir of dye solution can be used to minimize the proportion of degraded dye solution. However, the deleterious by-products accumulate and, in time, the overall dye solution will degrade as the laser is used.

To overcome this problem, many different types of dye circulation systems have been devised either to minimize the generation of deleterious by-products, or to remove the deleterious by-products by means of filtering systems.

An ideal approach to keep the dye solution from degrading under use is to identify a filter that selectively removes the contaminant that degrades the laser output. A generic concept of such a circulation system was disclosed as U.S. Pat. No. 4,364,015 by Drake et al. Although the patent describes the circulation system in a generic manner, the exact nature of the selective filter that removes degradation by-products is not described; nor has such a filter been discovered that can universally be used with all dye laser solutions. Mostovnikov describes a filter that appears to have the properties of a selective filter (V. A. Mostovnikov et al., "Recovery of lasing properties of dye solutions after their photolysis, American Institute of Physics, Sov. J. Quantum Electron, Vol. 6, No. 9, September 1976). Attempts to duplicate his approach in commercial dye lasers that require repetitive operation of tens of thousands of pulses have been unsuccessful.

It is unlikely that a universal selective filter can be discovered because there are infinite combinations of dyes, solvents, and additives used in dye lasers. The filter described in U.S. Pat. No. 4,364,015 to remove dye solute is identified as a charcoal bed filter. Charcoal is effective in removing most dye solutes used in flashlamp excited dye lasers. Charcoal bed filters have also been shown to be selective in removing deleterious by-products generated in dye laser solutions.

Another complication that arises in finding filters that remove dye solute or degradation products is the rate of degradation of the dye solution. Certain dye solutions degrade slowly and the degradation by-products contributed by each excitation pulse is low. Dye solution life is long, and simple degradation compensation schemes, such as increasing the excitation pulse to compensate for loss in gain produced by the degradation products, can be used. In other cases, the solution volume irradiated by the excitation pulse is so full of degraded by-products that it is best to discard the irradiated volume than send the irradiated volume back to the reservoir where it can contaminate the solution in the reservoir. A dye circulation system that extracts the excited and degraded solution in a single shot is described in U.S. Pat. No. 4,977,571 to Furumoto et al.

If a rapidly degrading dye solution is used with a dye circulation system described in U.S. Pat. No. 4,364,015, the flow in the cleaning loop must be increased to keep up with the degradation. The system will work but the flow in the bypass cleaning loop will increase to be equal to, or greater than, that in the loop that contains the laser head. If the flow in the cleaning loop is large, the metering pump must add a considerable amount of dye concentrate to keep the dye concentration at the optimum level. It has been known for some time that in a situation where the dye solution flow through the cleaning loop is large and the dye solute added is large, or if concentrate is added continuously without replacing the filter, the solute removing filter will begin to load up with dye solute and not be able to remove all of the dye solute coming into the filter. However, it was noted that the filter, if it is a charcoal filter, has the property of removing degradation by-products that reduced the gain of the laser as well as dye solute, even if it passed dye solute. The above observations were also noted by Garden et al. and presented in U.S. Pat. No. 5,109,387. That patent describes the filter as being saturated with dye solute and the dye solution is regenerated by the filter.

SUMMARY OF THE INVENTION

Experiments with charcoal bed filters indicate that filters do not saturate with dye but continually absorb dye solute, though at a diminishing rate, and the dye solute concentration in solution does not come into equilibrium to maintain a constant concentration. The filter does not continually regenerate the dye solution and, in fact, experiments show that dye and additives must be added as the filter is used.

The present invention relates to a method of replenishing dye solution in a dye laser. Prior to operation of the dye laser, a solid state porous system with restricted geometries is loaded with solute to act as a repository of dye solute. Specifically, solution at a predetermined operating dye solute concentration flowing into the porous bed filter, PBF, repository remains at substantially the same concentration. With firing of the laser, the PBF serves the necessary function of filtering out undesirable by-products of the lasing process. However, since it was preloaded, only minimal amounts of dye solute are filtered out. Solute concentration in the dye solution, which may include dye solute concentration and additive solute concentration, is monitored, and solutes are replenished as required in response to changes in the monitored solute concentration. Preferably, only dye concentration is monitored, but both dye solute and additive solute, such as cyclooctatetraene (COT), can be added together.

Since the filtering action of the PBF is very temperature dependent, temperature of the dye solution is monitored and controlled, preferably within ±2.5° C. With the solute metering and close temperature control, color output of the laser is very stable and solute concentration can be closely controlled to maximize color output at the wavelength selected by the optical color regulator often found on dye lasers.

Preferably, dye solute concentration is monitored by monitoring optical absorption of the solution. In a preferred embodiment, light is directed from a light source through a first filter and through dye solution to a detector in a first channel and from the same light source through a second filter to a detector in a second channel. The monitor filters have a passband at a characteristic absorption wavelength of the dye solution and, unlike a spectrophotometer, reject broadband fluorescence of the dye solution. The outputs to the two channels are compared to provide the indication of dye concentration. The sensitivity of the two channels may be adjusted so that they yield the same signal strength when the concentration of the solute in solution is the desired operating concentration. A difference signal between the two channels may be digitized and loaded into an electronic counter with a solute metering pump being driven by the counter.

The monitoring and replenishing steps need not be performed continuously but may be performed after some predetermined number of firings of the laser. The number of firings may be adjustable to match solute degradation rate.

The solute concentration balance between the filter and the solution is highly temperature sensitive. Preferably, a temperature sensor is located in the circulation loop to monitor the temperature, and a temperature controller is used to control a heater and a cooling device to control the dye solution temperature.

The number of laser pulses that can be elicited from the dye solutions can be notably increased by maintaining the solution at a designated or preselected pH value. This pH maintenance is accomplished by adding one or more pH buffer substances to the solution. The addition of such buffers to the dye solution provides enhanced lasing process life to these solutions.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENT

Figure 1:
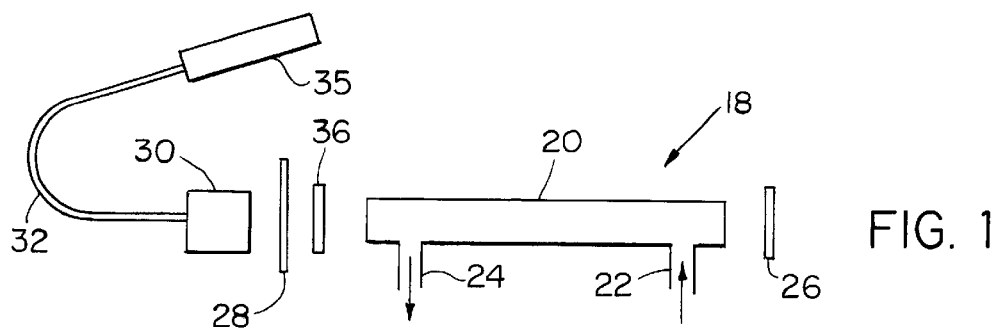
FIG. 1 is a schematic illustration of the optical portion of a dye laser system embodying the present invention.

FIG. 1 is an optical schematic of a laser system embodying the present invention. The laser cavity is a dye cell 20 through which a dye solution flows from an input 22 to an output 24. The dye solution is typically energized by a flash of light from a flashlamp (not shown) which causes the dye in the solution to lase. Light emitted from the back end of the dye cell is reflected back into the cell by a reflector 26; whereas, light emitted from the front end of the dye cell is only partially reflected by a reflector 28. Light not reflected by reflector 28 is the laser beam output from the system. A preferred application of the present invention is in a photothermolysis system. In that system the laser output is coupled through an optical coupler 30 to an optical fiber 32 through which it is directed to a hand held wand 35 for treatment of a patient's skin.

A color regulator 36 is interposed between the dye cell 20 and the reflector 28. Typical intercavity laser tuners that can be used are interference filters, etalons, prisms, birefringent filters and gratings. Such regulators are typically found in systems to tune the color of the laser output and thus maintain a preset color despite changes in the dye solution. With the present invention, the requirement for such fine tuning is minimal, so the output at the preset wavelength can be maximized.

The color at which the laser output is most efficient is set principally by the dyes used in the dye solution, or by the ratio of two or more dyes in the solution if multiple dye solutes are used. The concentrations of the dyes are also established to establish energy output of the laser. In addition to the dyes in one or more solvents, the dye solution includes one or more additives such as triplet quenchers, e.g. cyclooctatetraene (COT), and solublizers. The solublizers assist in keeping high concentrations of solute in solution and may include dimethyl formamide, propanol carbonate, methanol, ethanol or isopropanol.

With each firing of the laser, one or more of the solutes in the solution may degrade. Of particular note is the degradation of COT, which was included to quench the triplet state of the dye in long pulse lasers such as those used in photothermolysis. COT degrades rapidly into by-products which must then be removed from the solution to avoid degradation of the laser output, and the COT must be replenished. Unfortunately, the filter employed, typically a charcoal bed filter, not only removes the COT by-products but also other solutes such as dye. Accordingly, to maintain proper operation of the laser over cycles in the order of tens of thousands, the dye must be replenished as well.

Another means to increase the useful life of the laser dye solutions is by maintaining these solutions at a proper pH value. This value can be determined empirically by ascertaining the number of laser pulses of useful quality that can be produced from a given quantity of laser dye in solution at a predetermined pH. The pH of the dye solution can be established and maintained by adding a suitable acid or base to the solution but, preferably, the pH is established and maintained by adding one or more pH buffer materials to the solution. Suitable buffers can be either organic or inorganic in nature. Examples of organic buffers include TRIS, MES and TES (Good's buffers). Examples of inorganic buffers include sodium phosphate, potassium phosphate and sodium bicarbonate. Mixtures of these buffer materials can be used if desired. The optimum pH will depend on the choice of solvent and solutes used. Once the optimum pH is determined, it can be maintained with the chosen buffers.

In a preferred embodiment of the present invention, the pH is maintained at a neutral to somewhat basic pH value, i.e. between pH 7.0 and pH 8.0. A particularly preferred pH value is pH 7.6 for the rhodamine dye laser solutions. This pH value can be adequately maintained with a mixture of $KH_2PO_4$ and $Na_2HPO_4$.

Figure 2:
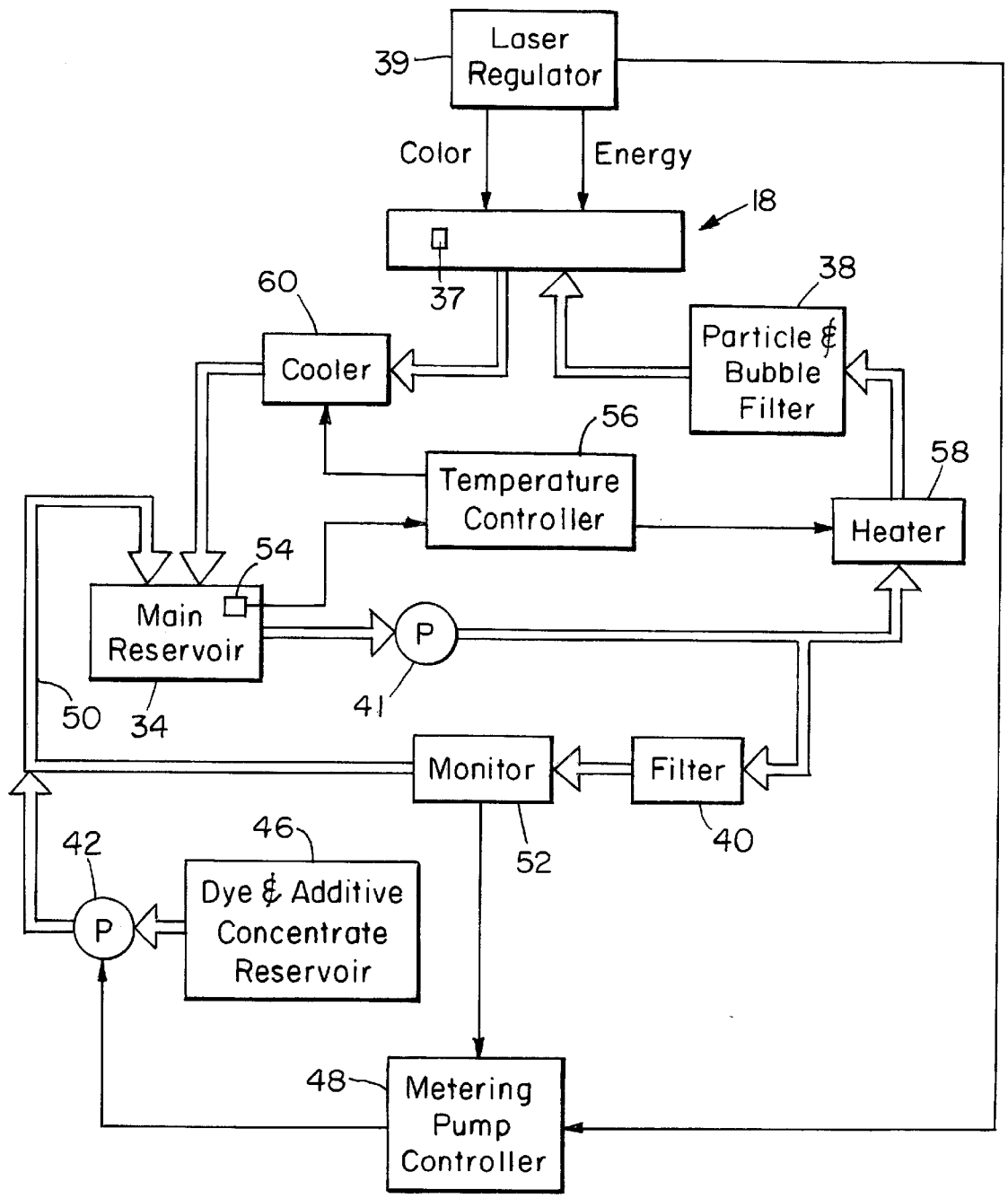
FIG. 2 is a schematic illustration of the dye handling portion of a dye laser system embodying the present invention.

FIG. 2 illustrates a dye circulation system embodying the present invention for assuring uniform color and energy output from the dye laser with multiple pulses of the laser. As in a conventional system, a dye solution is pumped from a main reservoir 34 by a main pump 41 through a particle and bubble filter 38 and the dye cell 20 of laser 18. The laser is controlled by regulator 39 which controls color tuning through the optical color regulator 37 and laser excitation energy.

In accordance with the present invention, a filter 40 such as a charcoal bed filter is provided in a filter loop for filtering out degraded solute and by-products of the laser operation. To replenish dye and additive such as COT, metering pump 42 delivers dye and additive concentrate from reservoir 46 into the filter bypass loop 50. Loop 50 returns the filtered and replenished dye solution to the main reservoir 34.

To control the metering process, a solute concentration monitor 52 is provided. That concentration monitor may take a number of forms, including optical or electrical sensors, but is preferably an optical monitor which senses light absorption at a wavelength corresponding to a signature of the dye solute or solutes as discussed below. A metering pump controller 48 controls the pump 42 in response to the monitored dye concentration. Although illustrated as being in a separate bypass loop, the filter and metering pump may be coupled into the main laser loop.

The filter 40 is required principally to filter out the by-products of the lasing process such as by-products of COT degeneration. Unfortunately, the filter also removes still effective dye solute. In the past, the filter has been allowed to load with dye during operation of the laser until it approaches a balanced state with the circulating solution wherein only small amounts of dye are removed by the filter. Thereafter the filter continues to be effective in removing the undesirable by-products.

In accordance with the present invention, the filter 40 is preloaded by circulating the dye solution through the filter for a period of time prior to firing of the laser. The filter may be preloaded at the factory to minimize the required size of the reservoir 46, or it may be preloaded from the reservoir 46 by cycling dye solution through the system while adding solute. In this way, with firing of the laser, the system does not first go through a period in which a large amount of dye is removed by the filter followed by a period during which only small amounts of dye are removed. With this system, small amounts of dye are consistently removed by the filter 40 and can be readily replenished with small amounts of dye concentrate delivered through the metering pump 42.

In a typical system, pump 41 pumps at about four gallons per minute. One fourth of the flow is to the laser cell while three fourths of the flow is through the filter 40. The dye concentrate in reservoir 46 would be 0.5 mole of dye in 100 liters of solvent, and the additive concentrate would be 0.3 mole of COT in $10^3$ liters of solvent. Since close control of dye concentration is much more critical than that of COT, the preferred system only monitors dye concentration and meters both dye solute and COT in response to the dye concentration. As an alternative, separate reservoirs and meter pumps may be provided for the dye and additive. In such a system, the dye and additive may be separately monitored for more precise metering of each.

A preferred example of a PBF repository is a carbon bed filter, particularly a charcoal bed filter. The large surface area of activated charcoal and numerous pores allow dye and additive molecules to remain in residence within its structure. The solvent too is held within this structure and a solute-solvent balance is obtained with the solution. Other filters which may serve the purpose include vycor glass, alumina, silica gel, zeolite, and molecular absorption filters.

If a PBF repository system is included in a circulation system of a dye laser, the volume of solution can be reduced dramatically because the PBF repository can keep enormous amounts of dye and additives and still maintain the solution concentration at a useful level. The charcoal bed filter has another great advantage in that it can remove degradation products that lower the efficiency of the dye laser.

In the more complex dye solutions used in dye lasers, the solution may contain one or more dyes, one or more additives, solublizers and one or more solvents. The formulation will depend on the concentration of each species and therefore, the combination, can be infinite. The color and energy level outputs of such systems change over multiple laser pulses and are also temperature dependent.

The problem of temperature dependency becomes more complex if solutes and additives are stored in porous bed filters. The surface area of a carbon or charcoal bed filter can be as much as 1,000 square meters per gram of carbon. Water molecules may have a cross sectional area of 10 square angstroms, ethylene glycol 25 square angstroms, and dye molecules perhaps 150 square angstroms. Each has a different activation energy in the porous bed filter. The partition function at the solid-liquid interface is extremely complex. Moreover, the access to the inner pores is slow and transport limited by diffusion. Equilibrium is reached asymptotically and experiments show that equilibrium by diffusion may take days or weeks to be reached. Temperature, however, strongly affects the partition function and temperature effects overshadow diffusion processes.

Figure 4:
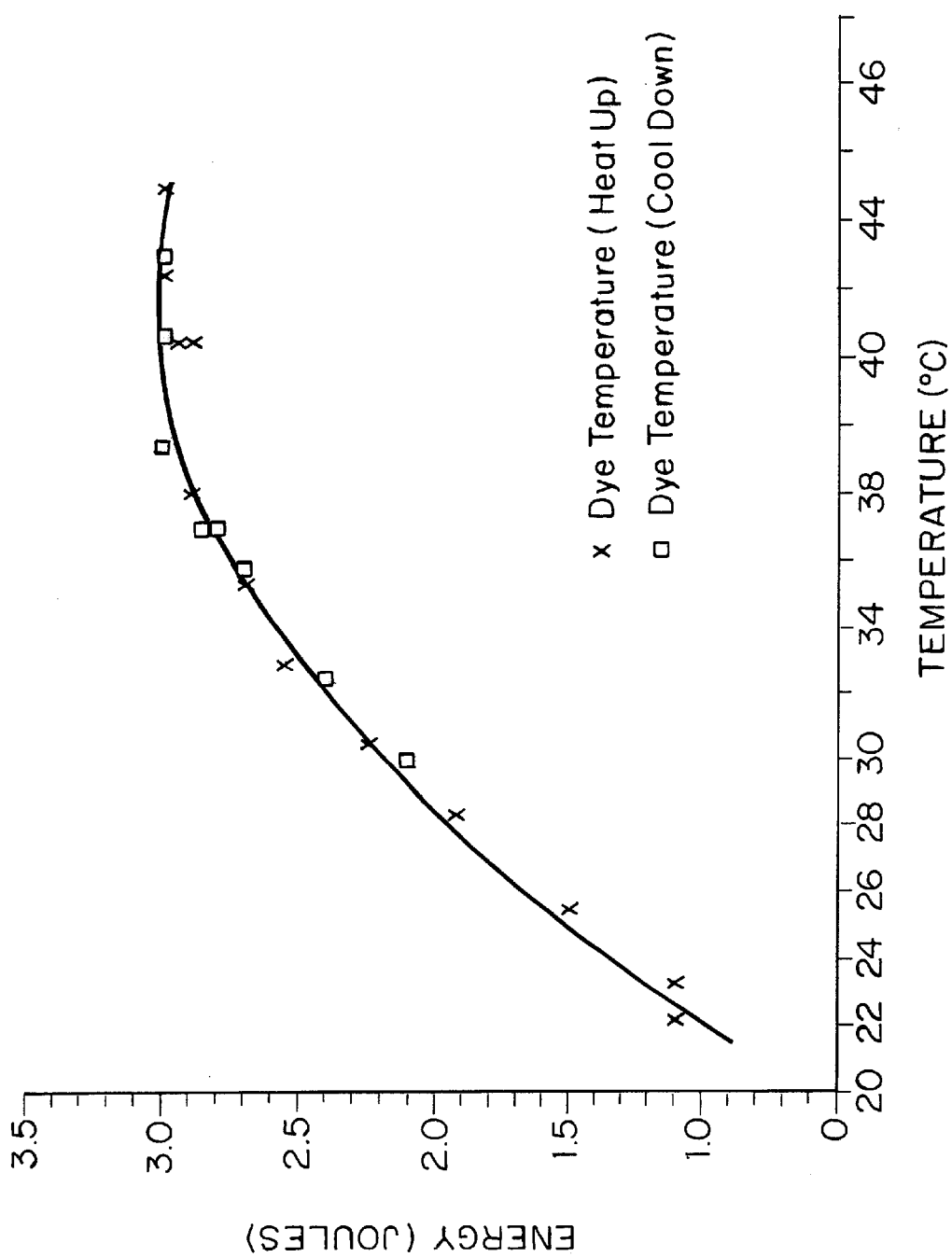
FIG. 4 is a plot of laser energy output relative to solution temperature for a given dye solution.

FIG. 4 shows how the energy output of a dye laser containing a PBF repository changes as a function of temperature for a selected filter and solvent, dye solute and additive combination. The maximum laser output should not be considered as absolutely corresponding to a temperature of 40 C and higher. Another PBF repository with a different solvent, solute and/or additive may give maximum laser output at another temperature. The curve is similar to a curve used to optimize the output of a dye laser by varying the concentration(s) in a standard circulation system. The change in temperature changes the concentration of dye solute and additive in solution. In FIG. 4, the concentration at 40 C is such that there is a maximum output. As the temperature is raised, more dye solute and additives are driven out of the reservoir and into the solution.

Figure 5:
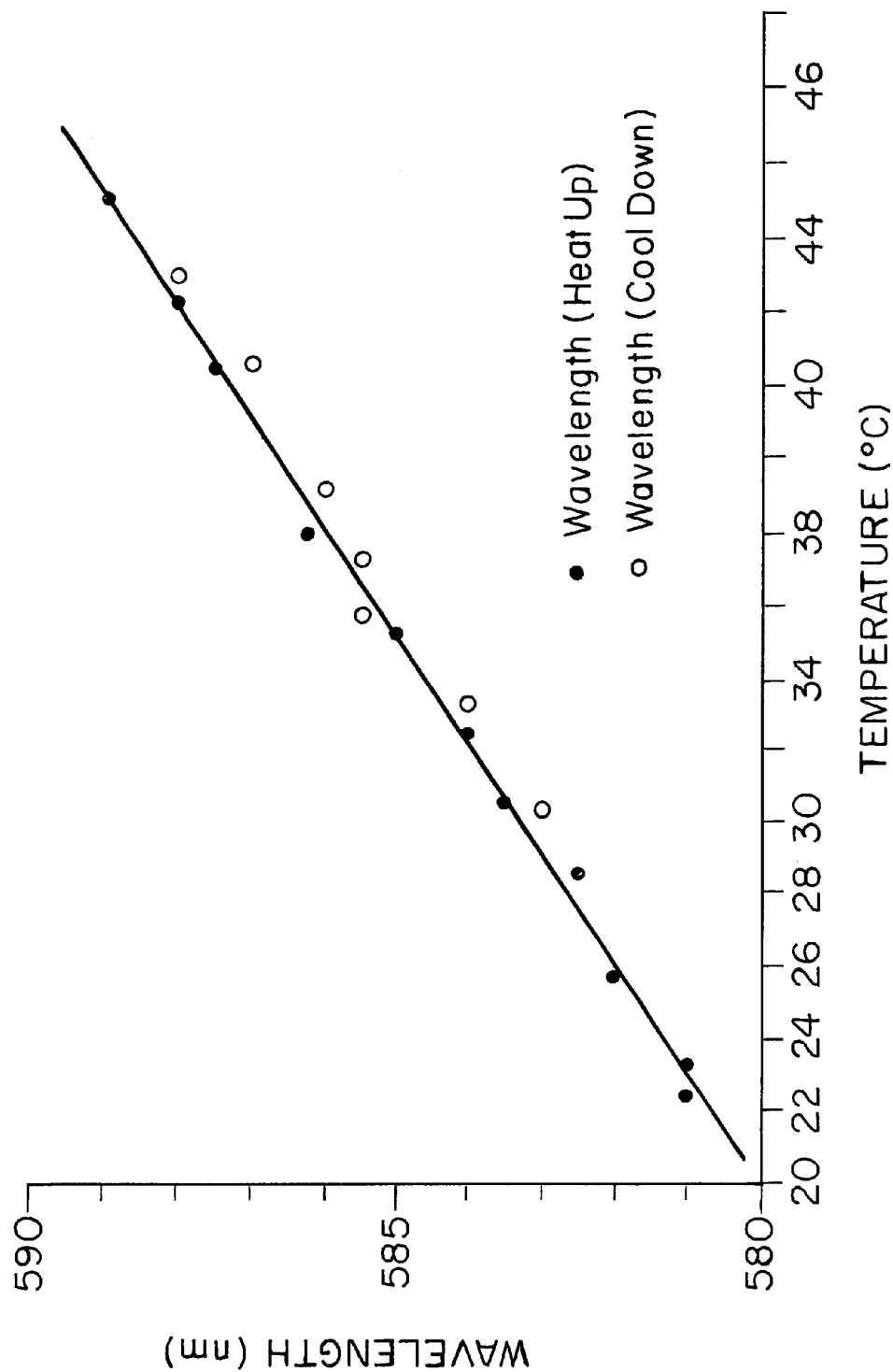
FIG. 5 is a plot of laser output wavelength against temperature for a given dye solution when a color regulator is not used.

FIG. 5 shows the color change of the dye laser containing the PBF repository described above. The color change again is not the direct result of a change in temperature, but more likely is due to the change in solute concentration. The dye solute, additive and solvent combination must be adjusted to give maximum output at the correct color at a chosen operating temperature. With experience, the choice from an infinite number of combinations can be reduced to a few combinations that are optimum or near optimum.

But the combination is only energy output optimum at some chosen temperature, and the color is such a strong function of temperature that it is important to thermostat the operating temperature. For treatment of vascular lesions using the principle of selective photothermolysis, it is important to keep the color variation to within ±2 nm and since the slope of the color versus temperature curve is linear at 0.8 nm/C, it is important that the system be controlled at ±2.5 C.

As illustrated in FIG. 2, the circulation system further includes a temperature sensor 54, preferably located in the main reservoir 34. A temperature controller 56 responds to the sensed temperature to control a heater 58 and/or liquid cooling heat exchanger 60 in the main circulation loop.

Good temperature regulation can be obtained by one of many available thermostats based on thermocouples, thermistors, liquid thermometers, and gas expansion bulbs. However, a good, accurate and nearly absolute thermometer can be derived using an integrated circuit temperature transducer such as AD592 by Analog Devices. They are convenient because in addition to having good sensitivity and range with a temperature coefficient in the order of microvolts/K, the output voltage is an absolute function of temperature, and therefore a comparison temperature calibration feature is not needed.

In the past, cooling systems have been used to counter the heating caused by the laser firing process, and such cooling heat exchangers have typically kept the dye solution at about room temperature. It has been determined, however, that so long as the dye solution has been properly specified for operation at higher temperatures, the actual temperature to which the solution is held is not critical. Thus, to minimize cooling required by the system, the present system preferably runs at about 38–40° C. To maintain consistent color output, that temperature is maintained within 2.5° C. and preferably within ±1° C. This higher temperature also provides the added advantage of requiring less dye in the system since at higher temperatures the filter removes less dye.

Figure 3:
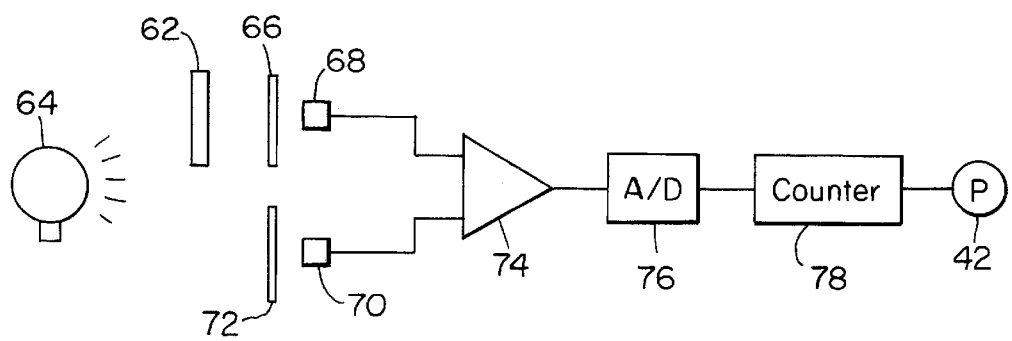
FIG. 3 is an electrical schematic of the solute concentration monitor and metering pump controller of FIG. 2.

As discussed above, the concentration of specific solutes (dye or additive) is monitored at 52 by means of optical absorption at a specific wavelength. As illustrated in FIG. 3, the solution being monitored is allowed to flow through a sensing cell 62. The solution is illuminated from one side by a pulsed source 64 of white light. An optical interference filter 66 on the opposite side of the sensing cell selects a specific, narrow range of wavelengths, with the center wavelength of the filter corresponding to a signature of the solute or solutes to be monitored. A photodiode 68 detects the light transmitted through the filter, and produces an electronic signal proportional to the amount of light reaching the photodiode.

A second, "reference" photodiode 70 also views the light source 64 through an identical optical interference filter 72, but without the intervening solvent. The sensitivity of the two detection channels (designated "sample" and "reference") are adjusted so that they yield the same electronic signal strengths when the concentration of the solute in solution is optimum for operation of the laser. As the concentration of the specific solute of interest decreases below the optimum value, the solution absorbs progressively less light at the selected wavelength, and the signal strength produced by the sample photodiode therefore increases relative to that of the reference photodiode.

The metering pump controller electronically subtracts the sample channel signal from the reference channel signal at comparator 74 producing a difference signal which increases in amplitude as the solute concentration decreases. The difference signal is used to control the injection of new solute in order to bring the solution back to optimum. New solute is injected in the form of a highly concentrated solution ("concentrate"), by means of an electrically actuated metering pump 42. Each actuation of the pump results in the injection of a known volume of concentrate into the laser dye solution. The number of pump actuations is derived directly from the difference signal by digitizing it in analog to digital converter 76 and loading the result into a counter 78 which in turn determines the number of metering pump actuations. In this way, the correct amount of concentrate is added each time the metering pump controller is operated.

The metering pump controller operates at discrete intervals. At the start of the operating sequence, the metering pump controller causes the light source in the solute concentration monitor to pulse. The metering pump controller then detects the resulting electrical signal from the reference photodiode 70. The controller digitizes the difference signal (reference minus sample), loads the result into the electronic counter 78, and actuates the metering pump 42 based on the counter contents. The sequence repeats periodically, based on the accumulated number of laser pulses since the last sequence. The number of pulses which elapse between operations may be adjusted thus allowing the system to be tailored to the specific requirements of any particular dye laser.

Figure 6:
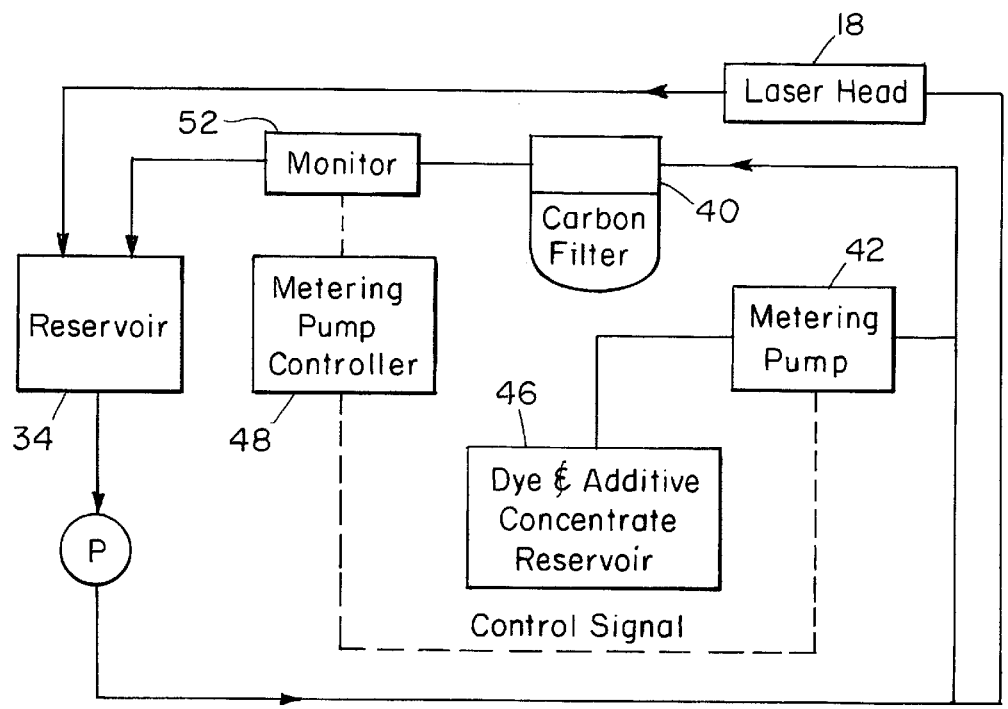
FIG. 6 is a schematic illustration of an alternative embodiment of the dye circulation portion of a dye laser system of the present invention.

The following example illustrates that the pH of the laser dye solution has a notable effect on the number of laser pulses which can be generated from a given quantity of the solution:

A long pulse dye laser with a dye circulation system as configured in FIG. 6 was tested with two dye formulations. The structural features in FIG. 6 are the same as those in FIG. 2 and therefore retain the same designation numbers. However, in this embodiment the dye concentrate is metered into the system before the filter to provide more stable control of the concentration through the laser. The temperature control system would also be included in the most preferred embodiment.

One dye formulation was:

| | |
|---|---|
| Rhodamine 560 | 4.4 gms |
| Rhodamine 590 | 5.76 gms |
| Ethylene Glycol | 3.2 liters |
| $H_2O$ | 3.2 liters |
| Cyclooctatetraene | 9 ml |
| $KH_2PO_4$ | 7.6 gm |
| $Na_2HPO_4$ | 28 gm |
| Activated Carbon Filter | 3" dia × 10" Fluid Solutions C231 |
| pH | 7.6 |

The other dye formulation was identical to the immediately preceding one with the exception that the $KH_2PO_4$ and $Na_2HPO_4$ substances were not present. The pH of this formulation was 3.5. The Rhodamine dyes were supplied by Exciton Chemical Corporation. Each alone lases at a wavelength of 560 and 590 nanometers, respectively, but the combination lases at about 585 nanometers.

The dye concentration monitor was set to inject concentrate below absorbance of 0.4 at 530 nm. The dye concentrate was a solution with 0.015 molar R560 and 0.02 molar R590 in ethylene glycol. The laser output was fixed at 2.5 J and a feedback system increased the voltage on the the capacitor bank to maintain constant output as the dye solution degraded. The voltage range was 4 KV to 6 KV. When the voltage reached 6 KV as the dye solution degraded, the system shut down and a warning was given.

The results with these laser dye solutions were:

| pH of Solution | No. of Laser Pulses at 1 Hz Before System Shut Down |
|---|---|
| 3.5 | 3,000–5,000 |
| 7.6 | greater than 100,000 |

The amount of concentrate injected during the pulsing period for both solutions was 250 ml.

These results show that maintaining the pH at 7.6 results in more than an order of magnitude more pulses from the dye solution before shutdown when compared to the dye solution without pH buffer. Thus, a given quantity of dye solution at pH 7.6 has at least 10×more usable pulse life.

Other rhodamine dyes can be used in the laser dye solutions, either alone or in combination with additional laser dyes. For example, rhodamine 575 or its derivatives can be used as the sole laser dye species in the laser dye solution. Alternatively, rhodamine 575 or its derivatives can be used in combination with rhodamine 590 as a laser dye solution mixture.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of replenishing a dye solution in a dye laser comprising:
    prior to operation of the dye laser, providing a porous bed filter repository loaded with solute in fluid communication with a dye cell of the dye laser; and
    with firing of the laser:
        monitoring solute concentration in the dye solution while the solution circulates in the laser; and
        replenishing solute in the dye solution in response to monitored solute concentration.

2. A method as claimed in claim 1 further comprising monitoring and controlling temperature of the dye solution.

3. A method as claimed in claim 2 wherein the temperature of said dye solution is controlled to within ±2.5° Centigrade.

4. A method as claimed in claim 1 further comprising optically regulating color output from the laser to vary the color output.

5. A method as claimed in claim 1 wherein the replenishing solute includes dye concentrate and additive concentrate.

6. A method as claimed in claim 5 wherein the additive includes triplet quencher and solublizers.

7. A method as claimed in claim 1 wherein the monitoring step is performed by monitoring optical absorption of the dye solution.

8. A method as claimed in claim 7 wherein the step of monitoring comprises directing light from a light source through a first filter and dye solution to a detector in a first channel, directing light from the light source through a second filter to a detector in a second channel and comparing the light detected through the two channels.

9. A method as claimed in claim 8 wherein the sensitivity of the two channels is adjusted so that they yield the same signal strengths when the concentration of the solute in solution is the desired operating concentration.

10. A method as claimed in claim 9 wherein a difference signal between the two channels is digitized and loaded into an electronic counter, and the solute is replenished by driving a metering pump from the electronic counter.

11. A method as claimed in claim 1 further comprising performing the steps of monitoring and replenishing periodically after a predetermined number of firings of the laser.

12. A method as claimed in claim 11 wherein the predetermined number is adjustable to match solute degradation rate.

13. A method as claimed in claim 1 wherein the porous bed filter comprises a carbon bed filter.

14. A method as claimed in claim 1 wherein dye concentration is monitored and both dye and the additive solute COT are replenished in response to the monitored dye concentration.

15. A method as claimed in claim 1 wherein the pH of the solution is maintained at a preselected pH value.

16. A method as claimed in claim 15 wherein the preselected pH value is maintained with a buffer or buffer mixture.

17. A method as claimed in claim 1 wherein the dye solute is a mixture of rhodamine 560 and rhodamine 590.

18. A method of replenishing a dye solution in a dye laser comprising:
    maintaining the pH of the dye solution in the laser at a preselected pH value;
    monitoring and controlling temperature of the dye solution in the laser;
    monitoring solute concentration in the dye solution of the laser; and
    replenishing solute in the dye solution of the laser in response to monitored solute concentration.

19. A method as claimed in claim 18 wherein the preselected pH value is maintained with a buffer or buffer mixture.

20. A method as claimed in claim 18 wherein the temperature of said dye solution is controlled to within ±2.5° Centigrade.

21. A method of replenishing a dye solution in a dye laser comprising:
    maintaining the pH of the dye solution in the laser at a preselected pH value;
    monitoring solute and additive concentration in the dye solution of the laser; and
    replenishing solute and additive concentrate in the dye solution of the laser in response to monitored solute and additive concentration.

22. A method as claimed in claim 21 wherein the preselected pH value is maintained with a buffer or buffer mixture.

23. A method as claimed in claim 21 wherein the additive concentrate includes triplet quencher concentrate.

24. A method as claimed in claim 23 wherein the triplet quencher is COT.

25. A method as claimed in claim 23 additionally comprising:
    monitoring and controlling temperature of the dye solution.

26. A method as claimed in claim 25 wherein the temperature of said dye solution is controlled to within ±2.5° Centigrade.

27. A method of replenishing a dye solution in a dye laser comprising:
    monitoring and controlling temperature of the dye solution in the laser;
    monitoring solute and additive concentration in the dye solution of the laser; and replenishing solute and additive concentrate in the dye solution of the laser in response to monitored additive concentration.

28. A method as claimed in claim 27 wherein the additive concentrate includes triplet quencher concentrate.

29. A method as claimed in claim 28 wherein the triplet quencher is COT.

30. A method as claimed in claim 27 wherein the temperature of said dye solution is controlled to within ±2.5° Centigrade.

31. A system for replenishing a dye solution in a dye laser comprising:

a monitor of dye solute adapted to monitor solute concentration in the dye solution of the laser;

a solute supply for replenishing dye solute in the dye solution in response to the monitored dye solute concentration; and a dye solution temperature monitor and controller adapted to monitor and control temperature of the dye solution in the laser.

32. A system as claimed in claim 31 wherein the pH of the dye solution is maintained at a preselected pH value with a buffer or buffer mixture.

33. A system as claimed in claim 31 wherein the monitor for dye solute comprises at least one dye solution optical absorption light source and detector wherein optical detection is at a characteristic wavelength of the dye solution.

34. A system as claimed in claim 31 wherein the monitor comprises a light source for illuminating first and second channels, the first channel comprising a first filter, a sample of dye solution and a photodetector and a second channel comprising a second filter and a second photodetector, the monitor comparing the light detected by the two light detectors.

35. A system as claimed in claim 31 wherein the sensitivity of the two channels is such that each yields the same photodetector signal strength when the concentration of the solute in solution is the desired operating concentration.

36. A system as claimed in claim 31 further comprising an electronic counter for receiving a digitized difference signal from the photodetectors, the counter driving a metering pump.

37. A system as claimed in claim 31 further comprising a controller which initiates monitoring and replenishing periodically after a predetermined number of firings of the laser.

38. A dye laser system comprising:

a dye laser cell;

a monitor of dye solute adapted to monitor solute concentration in the dye solution of the laser;

a solute supply for replenishing dye solute in the dye solution of the dye laser in response to the monitored dye solute concentration; and a dye solution temperature monitor and controller for monitoring and controlling temperature of the dye solution in the laser.

39. A system as claimed in claim 38 further comprising a porous bed filter.

40. A system as claimed in claim 39 wherein the porous bed filter comprises a carbon bed filter.

41. A system as claimed in claim 38 wherein the pH of the solution is maintained at a preselected pH value with a buffer or buffer mixture.

42. A system as claimed in claim 41 wherein the pH of the solution is maintained at a pH value between 7.0 and 8.0.

* * * * *